(12) United States Patent
    Marsolek

(10) Patent No.: US 10,669,678 B2
(45) Date of Patent: Jun. 2, 2020

(54) SYSTEM AND METHOD FOR GENERATING A PAVING MATERIAL MAP

(71) Applicant: Caterpillar Paving Products Inc., Brooklyn Park, MN (US)

(72) Inventor: John L. Marsolek, Watertown, MN (US)

(73) Assignee: Caterpillar Paving Products Inc., Brooklyn Park, MN (US)

( * ) Notice: Subject to any disclaimer, the term of this patent is extended or adjusted under 35 U.S.C. 154(b) by 60 days.

(21) Appl. No.: 15/841,723

(22) Filed: Dec. 14, 2017

(65) Prior Publication Data

US 2019/0186084 A1 Jun. 20, 2019

(51) Int. Cl.
| | |
|---|---|
| *E01C 19/28* | (2006.01) |
| *E01C 19/48* | (2006.01) |
| *E01C 19/00* | (2006.01) |
| *E01C 23/01* | (2006.01) |
| *B65G 65/46* | (2006.01) |
| *G01J 5/08* | (2006.01) |
| *B65G 47/19* | (2006.01) |
| *E01C 23/10* | (2006.01) |
| *G01J 5/00* | (2006.01) |

(52) U.S. Cl.
CPC ............ *E01C 19/288* (2013.01); *B65G 47/19* (2013.01); *B65G 65/46* (2013.01); *E01C 19/002* (2013.01); *E01C 19/48* (2013.01); *E01C 19/488* (2013.01); *E01C 23/01* (2013.01); *E01C 23/10* (2013.01); *G01J 5/0859* (2013.01); *E01C 2301/20* (2013.01); *G01J 2005/0077* (2013.01); *G01J 2005/0085* (2013.01); *G06T 2207/30164* (2013.01)

(58) Field of Classification Search
CPC .... E01C 19/288; E01C 19/002; E01C 19/488; E01C 23/01; E01C 2301/20; B65G 47/19; B65G 65/46
See application file for complete search history.

(56) References Cited

U.S. PATENT DOCUMENTS

| | | | |
|---|---|---|---|
| 6,749,364 B1 * | 6/2004 | Baker | E01C 19/288 404/118 |
| 7,491,014 B2 * | 2/2009 | Sick | E01C 19/004 404/133.05 |
| 8,099,218 B2 | 1/2012 | Glee et al. | |

(Continued)

FOREIGN PATENT DOCUMENTS

| | | |
|---|---|---|
| EP | 2666908 | 11/2013 |
| WO | 2016198333 | 12/2016 |

*Primary Examiner* — Abigail A Risic
(74) *Attorney, Agent, or Firm* — Lee & Hayes, PLLC

(57) ABSTRACT

A method includes determining a first temperature of paving material, determining a first location of a paving machine corresponding to the first temperature, determining a second temperature of the paving material, and determining a second location of the paving machine corresponding to the second temperature. The method also includes generating a paving material map based at least partly on the first and second temperatures, and the first and second locations. The method further includes causing at least part of the paving material map to be displayed. The displayed at least part of the paving material map including visual indicia indicating the first temperature and the second temperature.

20 Claims, 9 Drawing Sheets

(56) References Cited

U.S. PATENT DOCUMENTS

| | | | |
|---|---|---|---|
| 8,356,957 B2* | 1/2013 | Weiser | E01C 19/48 404/72 |
| 8,827,591 B2* | 9/2014 | Begley | E01C 19/48 404/118 |
| 8,936,145 B2 | 1/2015 | Buschmann et al. | |
| 9,394,653 B2 | 7/2016 | Rutz et al. | |
| 9,476,168 B2 | 10/2016 | Oetken et al. | |
| 9,759,708 B2 | 9/2017 | Marsolek et al. | |
| 10,280,572 B1* | 5/2019 | Thiesse | E01C 19/48 |
| 2009/0142133 A1* | 6/2009 | Glee | E01C 19/004 404/75 |
| 2012/0288328 A1* | 11/2012 | Minich | E01C 23/07 404/72 |
| 2014/0086684 A1* | 3/2014 | Sehr | G01D 21/02 404/84.05 |
| 2016/0042235 A1 | 2/2016 | Buschmann et al. | |
| 2016/0061755 A1 | 3/2016 | Delius et al. | |
| 2016/0266610 A1* | 9/2016 | Nessel | B60R 11/0252 |
| 2017/0322088 A1* | 11/2017 | Becher | E01C 19/48 |
| 2019/0078275 A1* | 3/2019 | Shelstad | E01C 23/01 |

\* cited by examiner

SYSTEM AND METHOD FOR GENERATING A PAVING MATERIAL MAP

TECHNICAL FIELD

The present disclosure relates to a control system for a paving machine. More specifically, the present disclosure relates to a control system configured to generate a paving material map including visual indicia of paving material temperatures.

BACKGROUND

A paving machine, such as an asphalt paver, is a self-propelled construction machine designed to receive, convey, distribute, profile, and partially compact paving material. Such a paving machine may accept heated paving material (e.g., asphalt) into a receiving hopper at the front of the paving machine. The heated asphalt material in the hopper is conveyed to the rear of the paving machine by conveyors positioned at a base of the hopper. The asphalt material is then distributed across a width of the paving machine by means of two opposing screws or augers. Finally, a screed assembly located at the rear of the paving machine profiles and compacts the asphalt material into a mat on the paving surface.

Although the paving material mat is typically formed while the paving material is within a desired temperature band, in some situations, different sections of the paving material mat may have significantly different respective temperatures due to variations in paving material production temperatures, delivery schedules, ambient conditions, and other factors. Such differences in temperature between sections of the paving material mat may result in corresponding variations in the compaction requirements for the respective sections, thereby increasing the complexity of the paving process. Although most operations in the paving process rely heavily on the training, skill, and experience of paving machine operators, it can be difficult for such operators to perceive such differences in temperature.

An example system for determining paving material temperatures is described in U.S. Pat. No. 8,936,145 (hereinafter referred to as the '145 reference). In particular, the '145 reference describes a material conveyor system for improving temperature homogeneity in asphalt mixtures in order to provide better compaction. The '145 reference describes a temperature measurement system which monitors the temperature of the asphalt in main conveyors of a paving machine and/or in transverse conveyors of the paving machine. The '145 reference does not, however, disclose details related to estimating the temperature of a resulting paving material mat. Further, the various temperature measurement equipment described in the '145 reference may add considerable additional cost to the disclosed paving machine.

Example embodiments of the present disclosure are directed toward overcoming the deficiencies described above.

SUMMARY

In an aspect of the present disclosure, a method includes determining a first temperature of paving material at an auger assembly of a paving machine, the paving machine depositing the paving material on a paving surface, determining a first location of a paving machine corresponding to the first temperature, determining a second temperature of the paving material at the auger assembly, and determining a second location of the paving machine corresponding to the second temperature, wherein the second location is different from the first location. Such an example method also includes generating a paving material map based at least partly on the first temperature, the first location, the second temperature, and the second location. Such a method further includes causing at least part of the paving material map to be displayed via a control interface of the paving machine. In such methods, the at least part of the paving material map displayed via the control interface includes a first graphic, the first graphic including visual indicia indicating the first temperature and the second temperature.

In another aspect of the present disclosure, a control system includes a communication device configured to determine a location of a paving machine, a temperature sensor associated with the paving machine and configured to determine temperatures of paving material, and a controller in communication with the communication device and the temperature sensor. The controller is configured to receive a first signal from the temperature sensor, the first signal including first information indicative of a first temperature of the paving material, and receive a second signal from the communication device, the second signal including second information indicative of a first location of the paving machine corresponding to the first temperature. The controller is also configured to receive a third signal from the temperature sensor, the third signal including third information indicative of a second temperature of the paving material, and receive a fourth signal from the communication device, the fourth signal including fourth information indicative of a second location of the paving machine corresponding to the second temperature. The controller is further configured to generate a paving material map based at least partly on the first temperature, the first location, the second temperature, and the second location, and cause at least part of the paving material map to be displayed via a control interface of the paving machine. In such examples, the at least part of the paving material map displayed via the control interface includes a first graphic, the first graphic including visual indicia indicating the first temperature and the second temperature.

In yet another aspect of the present disclosure, a paving machine includes a hopper adapted to receive paving material, an auger assembly, a conveyor system adapted to convey the paving material from the hopper to the auger assembly, wherein the auger assembly is adapted to provide the paving material received from the conveyor system to a screed portion of the paving machine, and a temperature sensor configured to determine temperatures of the paving material. The paving machine also includes a communication device configured to determine a location of the paving machine, and a controller in communication with the temperature sensor and the communication device. The controller is configured to receive a first signal from the temperature sensor, the first signal including first information indicative of a first temperature of the paving material, and receive a second signal from the communication device, the second signal including second information indicative of a first location of the paving machine corresponding to the first temperate. The controller is also configured to receive a third signal from the temperature sensor, the third signal including third information indicative of a second temperature of the paving material, and receive a fourth signal from the communication device, the fourth signal including fourth information indicative of a second location of the paving machine corresponding to the second temperature. The controller is further configured to generate a paving material map based at least partly on the first temperature, the first location, the second temperature, and the second location. The paving material map includes a first graphic, the first graphic including visual indicia indicating the first temperature and the second temperature.

DETAILED DESCRIPTION

Figure 1:
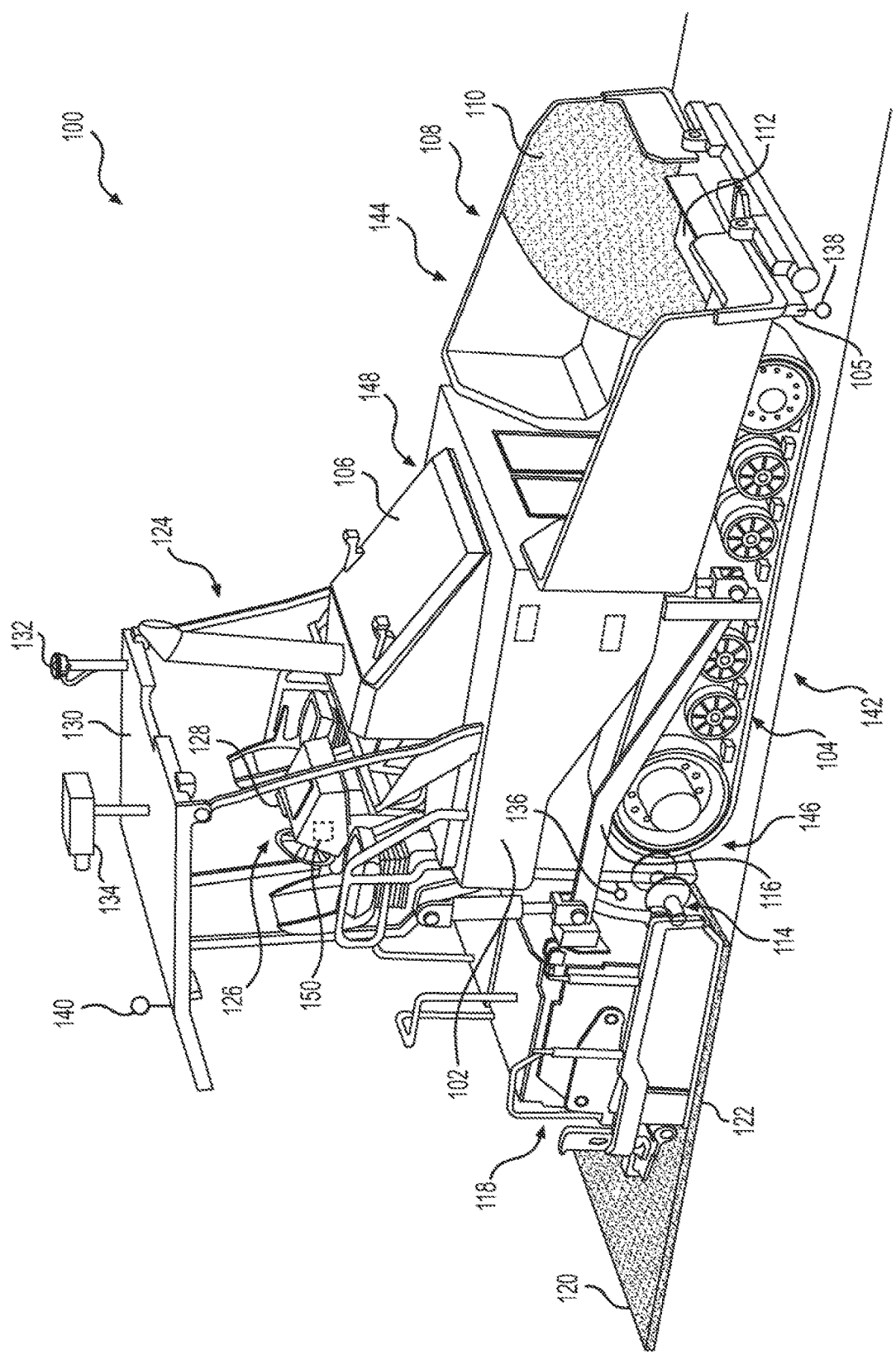
FIG. 1 is a perspective view of a paving machine in accordance with an example embodiment of the present disclosure.

Wherever possible, the same reference numbers will be used throughout the drawings to refer to the same or like parts. FIG. 1 shows an exemplary machine 100. The machine 100 is illustrated as a paving machine 100 which may be used, for example, for road or highway constructions, and other allied industries. Alternatively, the machine 100 may be any other machine used for laying asphalt, concrete, or like materials. While the following detailed description describes an exemplary aspect in connection with the paving machine 100, it should be appreciated that the description applies equally to the use of the present disclosure in other machines 100 as well.

The paving machine 100 includes a tractor portion 102 supported on a set of ground-engaging elements 104. The tractor portion 102 includes a tractor frame 105, as well as a power source 106 for driving the ground-engaging elements 104. Although the ground engaging elements 104 are illustrated as continuous tracks, it should be contemplated that the ground engaging elements 104 may be any other type of ground engaging elements as well, for example, wheels etc. The power source 106 may be a conventional internal combustion engine operating on fossil or hybrid fuels, or an electrically operated drive powered by alternate energy sources. The paving machine 100 includes a hopper 108 for storing a paving material 110. The paving machine 100 also includes a conveyor system 112 for conveying the paving material 110 from the hopper 108 to other downstream components of the paving machine 100. For example, the paving machine 100 includes an auger assembly 114 which receives the paving material 110 supplied via the conveyor system 112, and distributes the paving material 110 on the paving surface 122. In an example embodiment, the auger assembly 114 may include at least one main auger. In some embodiments, the auger assembly 114 may include a main auger, and an auger extension coupled to the main auger via an auger bearing or other coupling component. As will be described below, in further examples, the auger assembly 114 may include a main auger and an additional auger disposed opposite the main auger. In such examples, the main auger and the additional auger may be configured to distribute the paving material 110 across substantially an entire width of the paving machine 100. The paving machine 100 further includes a tow arm 116 which couples a height adjustable screed portion 118 to the tractor portion 102 so as to spread and compact the paving material 110 into a mat 120 on the paving surface 122. The tow arm 116 may be actuated by a hydraulic actuator, an electric actuator (not shown), and/or any other type of actuator as per application requirements.

Further referring to FIG. 1, an operator station 124 is coupled to the tractor portion 102. The operator station 124 includes a console 126 and other levers or controls (not shown) for operating the paving machine 100. For example, the console 126 includes a control interface 128 for controlling various functions of the paving machine 100. The control interface 128 may comprise an analog, digital, and/or touchscreen display, and such a control interface 128 may be configured to display, for example, at least part of a paving material map of the present disclosure. The control interface 128 may also support other allied functions, including for example, sharing various operating data with one or more other machines (not shown) operating in consonance with the paving machine 100.

As shown, the operator station 124 may include a roof 130. A communication device 132 and/or a camera 134 may be coupled to the roof 130. Alternatively, in other embodiments at least one of the communication device 132 and the camera 134 may be coupled to other portions of the paving machine 100. The communication device 132 is capable of determining a location of the paving machine 100, and may include and/or comprise a component of a global positioning system (GPS). For example, the communication device 132 may comprise a GPS receiver, transmitter, transceiver, and/or other such device, and the communication device 132 may be in communication with one or more GPS satellites (not shown) to determine a location of the paving machine 100 continuously, substantially continuously, or at various time intervals. In an embodiment, the communication device 132 may also enable the paving machine 100 to communicate with the one or more other machines, and/or with one or more remote servers, processors, or control systems located remote from the worksite at which the paving machine 100 is being used. The camera 134 may be a state of the art camera capable of providing visual feeds and supporting other functional features of the paving machine 100. In some examples, the camera 134 may comprise a digital camera configured to record and/or transmit digital video of the mat 120, paving surface 122, and/or worksite in real-time. In still other examples, the camera 134 may comprise an infrared sensor, a thermal camera, or other like device configured to record and/or transmit thermal images of the mat 120, paving surface 122, and/or worksite in real-time.

As shown in FIG. 1, the paving machine 100 may also include one or more temperature sensors 136, 138, 140. One or more such temperature sensors 136, 138, 140 may comprise a mechanical, electrical, electro-mechanical, electronic, infrared, or any other type of a temperature sensor known in the art. In some embodiments, one or more such temperature sensors 136, 138, 140 may include an air purge device or other such device (not shown) to prevent debris from forming on the temperature sensor. Such an example air purge device may receive purge air from an air source storing pressurized air to prevent any dirt, debris etc. which may stick to the temperature sensor.

In an example embodiment, the temperature sensor 136 may comprise a first temperature sensor connected to the paving machine 100 proximate the auger assembly 114, and the temperature sensor 136 may be configured to sense, measure, detect, and/or otherwise determine temperatures of the paving material 110 at the auger assembly 114. As shown in FIG. 1, the paving machine 100 may include a first side 142 (e.g., a right-hand side) and a second side 144 (e.g., a left-hand side) opposite the first side 142. Likewise, in such examples the auger assembly 114 may include a first portion 146 disposed on the first side 142 of the paving machine 100, and a second portion 148 (labeled in FIG. 1 but obstructed from view) disposed on the second side 144 of the paving machine 100. In such examples, the first portion 146 of the auger assembly 114 may include a first main auger extending laterally from proximate a center of the auger assembly 114. The first portion 146 of the auger assembly 114 may also include a first auger extension connected to the first main auger via a first auger bearing or other coupling component. Further, in such examples the second portion 148 of the auger assembly 114 may include a second main auger, opposite the first main auger, extending laterally from proximate the center of the auger assembly 114. The second portion 148 of the auger assembly 114 may also include a second auger extension connected to the second main auger via a second auger bearing or other coupling component. In such examples, the first main auger may be substantially coaxially aligned with the second main auger to assist in evenly depositing the paving material 110 on the paving surface 122 and/or across substantially an entire width of the paving machine 100.

In such examples, the temperature sensor 136 may be positioned proximate the first portion 146 of the auger assembly 114, and may be configured to determine the temperature of the paving material 110 at the first portion 146 of the auger assembly 114. Further, at least one additional temperature sensor (not shown) may be positioned proximate the second portion 148 of the auger assembly 114 on the second side 144 of the paving machine 100. In such examples, the at least one additional temperature sensor may be configured to determine the temperature of the paving material 110 at the second portion 148 of the auger assembly 114. In such examples, the temperature sensor 136 may be positioned and/or otherwise configured to determine the temperature of the paving material 110 at and/or proximate the first auger bearing described above, or at other locations associated with the first portion 146 of the auger assembly 114. Similarly, in such examples the at least one additional temperature sensor described above may be positioned and/or otherwise configured to determine the temperature of the paving material 110 at and/or proximate the second auger bearing described above, or at other locations associated with the second portion 148 of the auger assembly 114. For example, the temperature sensor 136 and/or the additional temperature sensor may comprise infrared sensors configured to sense, measure, and/or detect infrared radiation emitted by the paving material 110 as the paving material 110 passes the first and second auger bearings, and/or just before the paving material 110 is processed by the screed portion 118. The temperature sensor 136 may generate a signal including information indicative of the temperature of the paving material 110 at the first portion 146 of the auger assembly 114. Likewise, the additional temperature sensor described above may generate a signal including information indicative of the temperature of the paving material 110 at the second portion 148 of the auger assembly 114.

With continued reference to FIG. 1, the temperature sensor 138 may be positioned on the tractor frame 105, the hopper 108, and/or at any other location on the paving machine 100 convenient for determining a temperature of the paving surface 122. For example, the temperature sensor 138 may be positioned on the tractor frame 105 proximate the ground engaging elements 104, and/or at any other location convenient for determining a ground temperature. The temperature sensor 138 may be configured to generate a signal including information indicative of the ground temperature. Additionally, the temperature sensor 140 may be positioned on the roof 130, the tractor portion 102, and/or at any other location on the paving machine 100 convenient for determining an ambient temperature at the worksite. The temperature sensor 140 may also be configured to determine an ambient pressure and/or other parameters at the worksite. In such examples, the temperature sensor 140 may generate a signal including information indicative of ambient conditions such as ambient temperature, pressure, etc. It should be contemplated that the paving machine 100 may include various other sensors to measure various other parameters related to the paving machine 100 and/or the worksite.

The paving machine 100 may also include a controller 150 in communication with the control interface 128, the communication device 132, the camera 134, the temperature sensors 136, 138, 140, and/or other components of the paving machine 100. The controller 150 may be a single controller or multiple controllers working together to perform a variety of tasks. The controller 150 may embody a single or multiple microprocessors, field programmable gate arrays (FPGAs), digital signal processors (DSPs), and/or other components configured to calculate and/or otherwise determine the temperature of the paving material 110 based on one or more signals received from the temperature sensors 136, 138, 140. Numerous commercially available microprocessors can be configured to perform the functions of the controller 150. Various known circuits may be associated with the controller 150, including power supply circuitry, signal-conditioning circuitry, actuator driver circuitry (i.e., circuitry powering solenoids, motors, or piezo actuators), and communication circuitry. In some embodiments, the controller 150 may be positioned on the paving machine 100, while in other embodiments the controller 150 may be positioned at an off-board location and/or remote location relative to the paving machine 100. The present disclosure, in any manner, is not restricted to the type of controller 150 or the positioning of the controller 150 relative to the paving machine 100.

Figure 2:
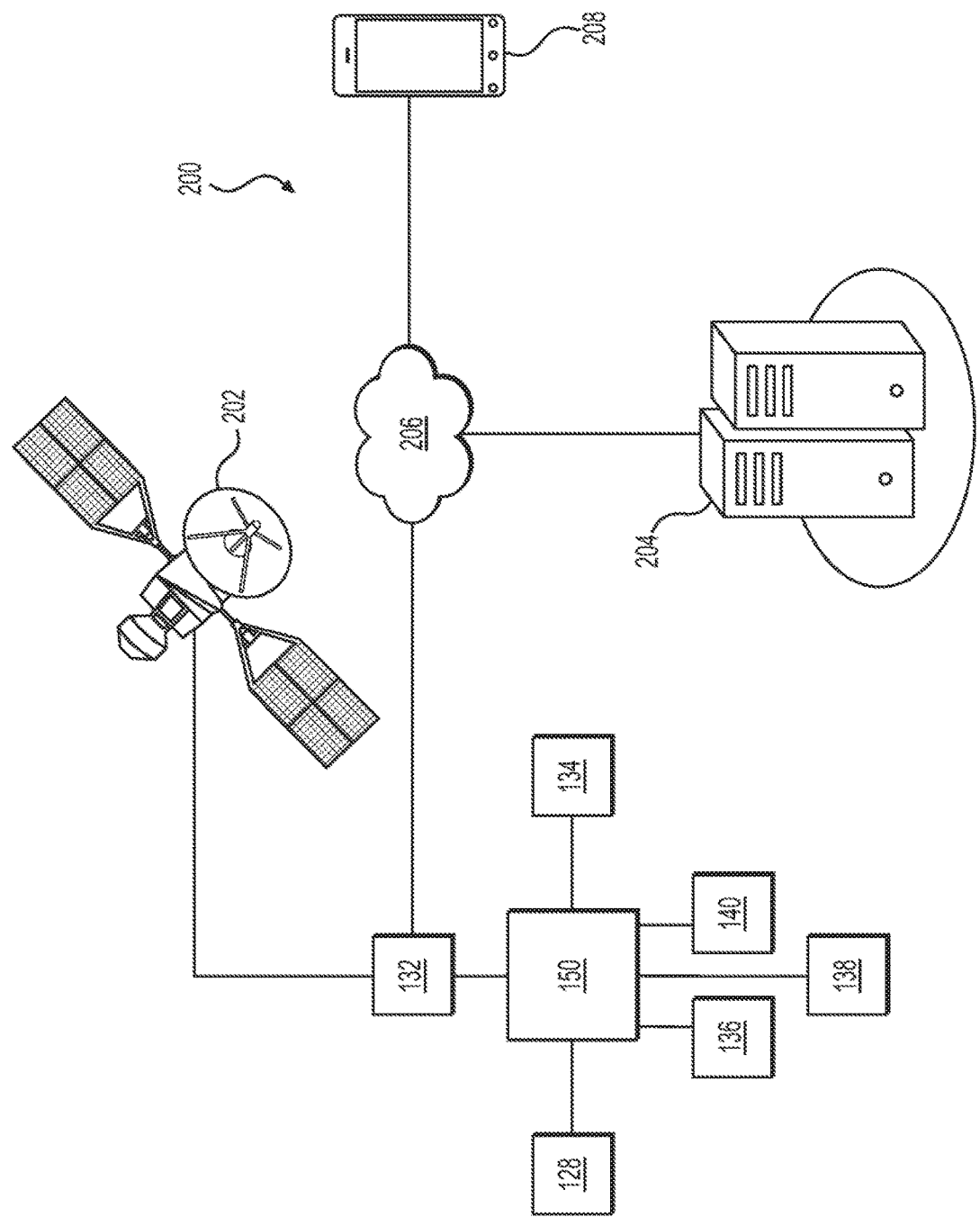
FIG. 2 is a block diagram schematically representing a control system associated with the paving machine in accordance with an example embodiment of the present disclosure.

FIG. 2 is a block diagram schematically illustrating an example control system 200 of the present disclosure. In any of the examples described herein, the control system 200 may include at least one of the controller 150, the control interface 128, the communication device 132, the camera 134, the temperature sensor 136, the additional temperature sensor (not shown) described above with respect to the second portion 148 of the auger assembly 114, the temperature sensor 138, the temperature sensor 140, and/or any other sensors or components of the paving machine 100. In such examples, the controller 150 may be configured to receive respective signals from such components. For example, the controller 150 may receive one or more signals from the communication device 132 including information indicating a location of the paving machine 100. As shown in FIG. 2, the communication device 132 may be connected to and/or otherwise in communication with one or more satellites 202 or other GPS components configured to assist the communication device 132 in determining the location of the paving machine 100. In some examples, such satellites 202 or other GPS components may comprise components of the control system 200.

The controller 150 may also receive respective signals from the temperature sensor 136, the additional temperature sensor described above with respect to the second portion 148 of the auger assembly 114, the temperature sensor 138, and/or the temperature sensor 140. In such examples, the controller 150 may determine one or more core temperatures of the paving material 110 based at least partly on temperature information (e.g., a temperature of the paving material 110 determined by the temperature sensor 136 at the auger assembly 114, a ground temperature determined by the temperature sensor 138, and/or an ambient temperature determined by the temperature sensor 140) included in one or more such signals. The controller 150 may use such a core temperature and/or any of the other temperatures described herein, as well as the location of the paving machine 100 determined by the communication device 132, to generate one or more paving material maps. Such paving material maps may include, for example, visual indicia indicating temperatures of the paving material 110 at various locations of the paving machine 100. In some examples the visual indicia included in an example paving material map may be indicative of one or more of the core temperatures of the paving material 110. Additionally or alternatively, the visual indicia included in an example paving material map may be indicative of one or more of the respective temperatures determined by the temperature sensor 136, the additional temperature sensor described above with respect to the second portion 148 of the auger assembly 114, the temperature sensor 138, and/or the temperature sensor 140.

The controller 150 may determine the core temperature of the paving material 110 through extrapolation, using one or more temperature determination algorithms, using one or more neural networks, using one or more look-up tables, and/or through one or more additional methods. In an exemplary embodiment, the controller 150 may have an associated memory in which various extrapolation models, algorithms, look-up tables, and/or other components may be stored for determining the core temperature of the paving material 110 based on one or more inputs. Such inputs may include, for example, the temperature of the paving material 110 at the auger assembly 114 (as measured by the temperature sensor 136 and/or by the additional temperature sensor associated with the second portion 148 of the auger assembly 114), a ground temperature determined by the temperature sensor 138, and/or an ambient temperature determined by the temperature sensor 140. The controller 150 may also use the information included in one or more such signals to determine the surface temperature of the mat 120, as placed, through extrapolation, using one or more temperature determination algorithms, using one or more neural networks, using one or more look-up tables, and/or through one or more additional methods. In still further examples, additional information such as a wind speed, a paving material thickness, and/or cloud cover information may be used by the controller 150 to determine the core temperature of the paving material 110 and/or any of the other temperatures described herein. The wind speed, the paving material thickness, and/or the cloud cover information may be obtained from either machine equipped sensors or via off-board data sources.

As shown in FIG. 2, the control system 200 may also include one or more additional components. For example, the control system 200 may include one or more remote servers, processors, or other such computing devices 204. Such computing devices 204 may comprise, for example, one or more servers, laptop computers, or other computers located at a paving material plant remote from the worksite at which the paving machine 100 is being used. In such examples, the communication device 132 may be connected to and/or otherwise in communication with such computing devices 204 via a network 206. The network 206 may be a local area network ("LAN"), a larger network such as a wide area network ("WAN"), or a collection of networks, such as the Internet. Protocols for network communication, such as TCP/IP, may be used to implement the network 206. Although embodiments are described herein as using a network such as the Internet, other distribution techniques may be implemented that transmit information via memory cards, flash memory, or other portable memory devices. The control system 200 may further include one or more tablets, mobile phones, laptop computers, and/or other mobile devices 208. Such mobile devices 208 may be located at the worksite or, alternatively, one or more such mobile devices 208 may be located at the paving material plant described above, or at another location remote from the worksite. In such examples, the communication device 132 may be connected to and/or otherwise in communication with such mobile devices 208 via the network 206. In any of the examples described herein, the temperature information, location information, paving material maps, and/or any other information received, processed, or generated by the controller 150 may be provided to the computing devices 204 and/or the mobile devices 208 via the network 206.

Figure 3:
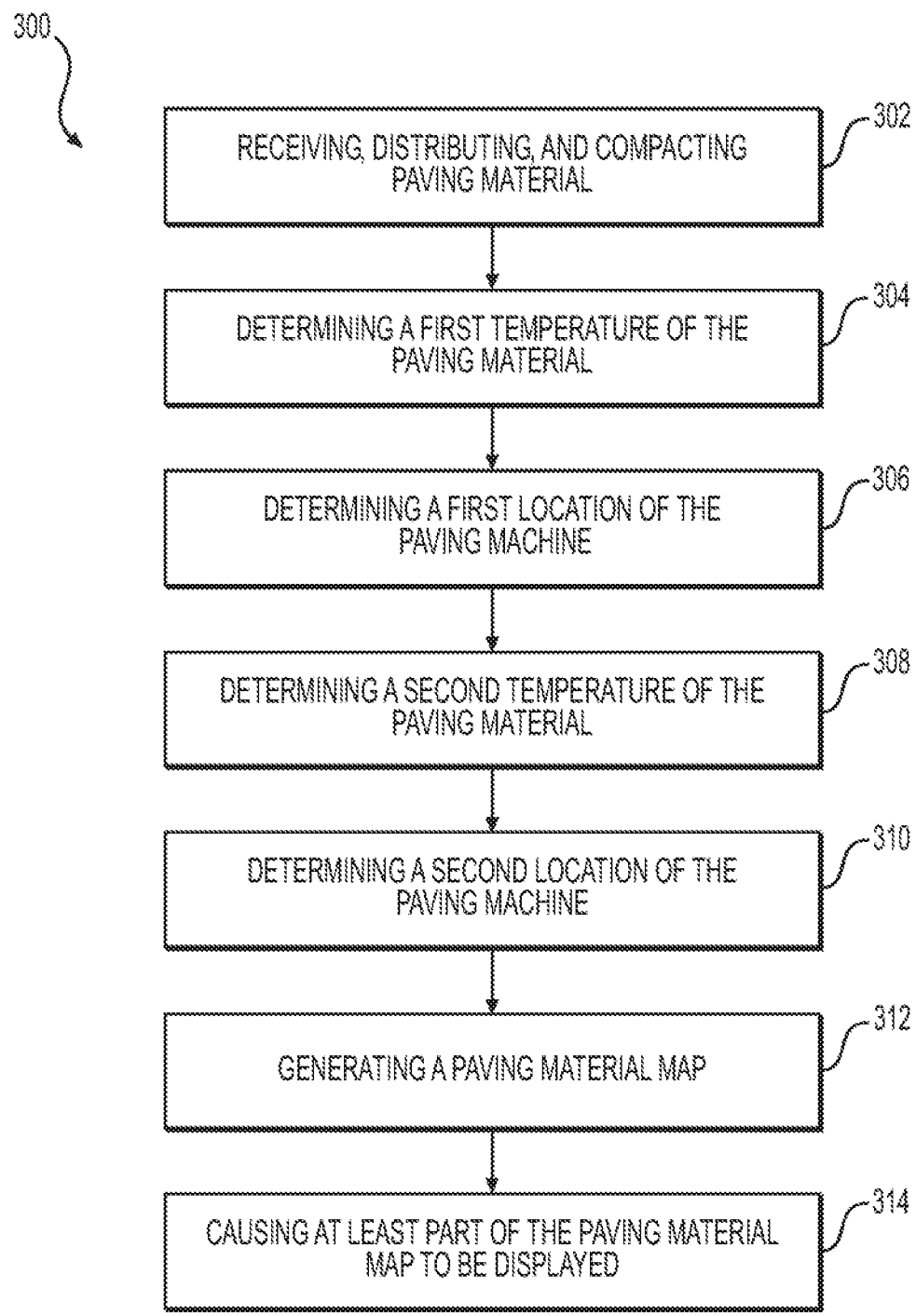
FIG. 3 is a flow chart depicting a method of generating a paving material map in accordance with an example embodiment of the present disclosure.

FIG. 3 illustrates a flow chart depicting a method 300 of generating a paving material map in accordance with an example embodiment of the present disclosure. The example method 300 is illustrated as a collection of steps in a logical flow diagram, which represents operations that can be implemented in hardware, software, or a combination thereof. In the context of software, the steps represent computer-executable instructions stored in memory. When such instructions are executed by, for example, the controller 150, such instructions may cause the controller 150, various components of the control system 200, and/or the paving machine 100, generally, to perform the recited operations. Such computer-executable instructions may include routines, programs, objects, components, data structures, and the like that perform particular functions or implement particular abstract data types. The order in which the operations are described is not intended to be construed as a limitation, and any number of the described steps can be combined in any order and/or in parallel to implement the process. For discussion purposes, and unless otherwise specified, the method 300 is described with reference to the paving machine 100 of FIG. 1 and the control system 200 of FIG. 2.

At 302, an example work cycle of the paving machine 100 may include receiving the paving material 110 in the hopper 108, distributing the paving material 110 by using the auger assembly 114, and/or compacting the paving material 110 into the mat 120 by using the screed portion 118. At 304, at least one of the temperature sensors 136, 138, 140, the controller 150, and/or other components of the control system 200 may determine a first temperature of the paving material 110. For example, at 304 the controller 150 may receive one or more signals from the temperature sensor 136 located proximate the first portion 146 of the auger assembly 114, as well as one or more corresponding signals from the additional temperature sensor (not shown) located proximate the second portion 148 of the auger assembly 114. Such signals may include information indicating respective temperatures of the paving material 110 determined at the first and second portions 146, 148 of the auger assembly 114 by the temperature sensor 136 and the additional temperature sensor. At 304, the controller 150 may also receive one or more additional signals including corresponding additional information. For example, at 304 the controller 150 may also receive a signal from the temperature sensor 138 including information indicating a ground temperature determined by the temperature sensor 138, a signal from the temperature sensor 140 including information indicating an ambient temperature at the worksite determined by the temperature sensor 140, and/or other such signals. In any of the examples described herein, one or more such signals (e.g., the signals received from the temperature sensor 136 and from the additional temperature sensor located proximate the second portion 148 of the auger assembly 114) may also include first timestamp information indicating the moment in time (e.g., hour, minute, second, millisecond, etc.) at which the temperature information or other information included in the corresponding signal was determined. It is understood that in some examples, the temperature sensor 136 and the additional temperature sensor located proximate the second portion 148 of the auger assembly 114 may simultaneously determine respective temperatures of the paving material 110. In some examples, at 304 the controller 150 may also determine a first temperature of the paving material 110 as set on the paving surface 122 (e.g., a core temperature of the mat 120 of paving material 110) based at least partly on the temperature information and/or other information included in one or more of the signals described herein.

At 306, the communication device 132, the controller 150, and/or other components of the control system 200 may determine a first location of the paving machine 100 corresponding to the first temperature determined at 304. For example, at 306 the controller 150 may receive one or more signals from the communication device 132. Such signals may include GPS coordinates (e.g., latitude and longitude coordinates), map information, and/or other information determined by the communication device 132 and indicating the location of the paving machine 100. Such signals may also include second timestamp information indicating the moment in time (e.g., hour, minute, second, millisecond, etc.) at which the location information or other information included in the signal was determined. In such examples, at 306 the controller 150 may correlate, associate, and/or otherwise match the first temperature determined at 304 with the first location determined at 306 based at least partly on the first and second timestamp information described above. For example, the controller 150 may determine that the first temperature correlates with, is associated with, and/or otherwise matches the first location if the first timestamp information is identical to the second timestamp information. In other examples, the controller 150 may determine that the first temperature correlates with, is associated with, and/or otherwise matches the first location if the first timestamp information is within an acceptable range of the second timestamp information. In such examples, an acceptable range may be less than one second, less than five seconds, less than ten seconds, less than one minute, and/or any other length of time or time interval. Based at least partly on determining that the first temperature matches the first location, the controller 150 may save, in a memory connected to the controller 150, the first temperature in association with the first location. In some examples, the controller 150 may generate a node (e.g., a first node) or other electronic data point based at least partly on determining that the first temperature matches the first location. Such a first node may include information indicating the first temperature and the first location, and the first node may be indicative of the first temperature and the first location. As will be described below, in some examples the controller 150 may utilize a plurality of such nodes to form a paving material map that illustrates particular temperatures at particular locations along the path of the paving machine 100.

Figure 4:
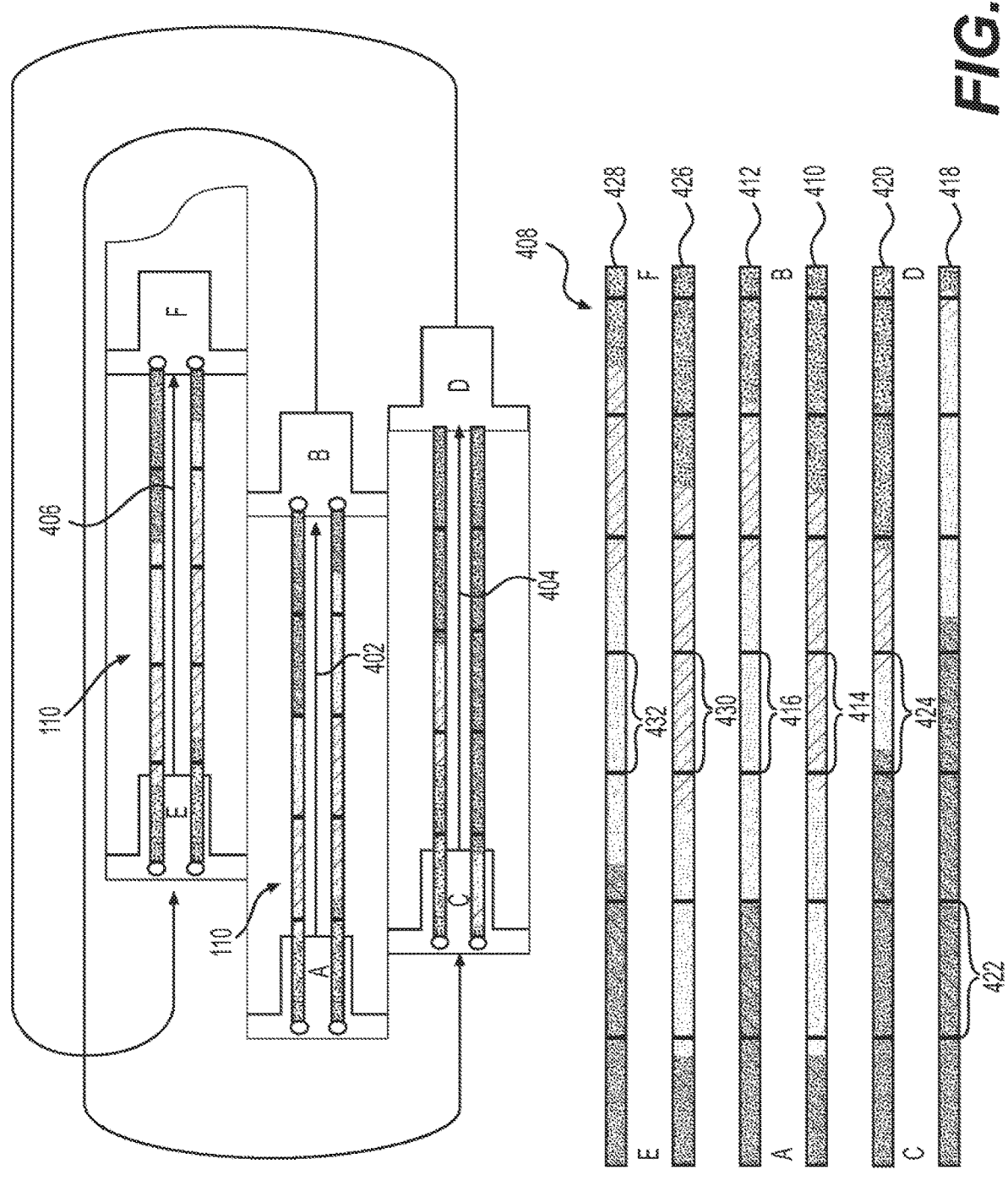
FIG. 4 is a schematic illustration of a paving machine depositing paving material on a paving surface, and a corresponding paving material map generated by a control system associated with the paving machine, according to an example embodiment of the present disclosure.

FIG. 4 illustrates an example travel plan 400 of a paving machine 100 at a typical worksite. As illustrated in FIG. 4, the paving machine 100 may be depositing paving material 110 along a path 402 extending from a location A to a location B, along a path 404 extending from a location C to a location D, and/or along a path 406 extending from a location E to a location F. While the example travel plan 400 of FIG. 4 includes three separate paths 402, 404, 406, in other example embodiments the travel plan 400 may include greater than or less than three paths 402, 404, 406 in order to produce a mat 120 of desirable width. Further, it is understood that within each path 402, 404, 406 the first portion 146 of the auger assembly 114 may deposit paving material 110 on the paving surface 122 simultaneously with the second portion 148 of the auger assembly 114, and adjacent to paving material 110 deposited on the paving surface 122 by the second portion 148. Accordingly, at 304 the controller 150 may receive one or more signals (e.g., a first signal) from the temperature sensor 136 located proximate the first portion 146 of the auger assembly 114, as well as one or more corresponding signals (e.g., a second signal) from the additional temperature sensor (not shown) located proximate the second portion 148 of the auger assembly 114. Such signals may include first timestamp information as well as information indicating respective temperatures of the paving material 110 determined at the first and second portions 146, 148 of the auger assembly 114 when the paving machine 100 is at location A. Similarly, at 306 the controller 150 may receive one or more signals from the communication device 132 including second timestamp information, as well as GPS coordinates and/or other information indicating a location of the paving machine 100 (e.g., indicating that the paving machine 100 is located at location A). For example, such signals from the communication device 132 may include GPS coordinates and/or other information identifying the location A with particularity. At 306, the controller 150 may match such temperature and location information based at least partly on the corresponding first and second timestamp information. In some examples, the controller 150 may also generate respective nodes or other electronic data points based at least partly on determining that the temperatures of the paving material 110 determined at the first and second portions 146, 148 match the first location. A first such node may include information indicating, for example, the temperature of the paving material 110 determined at the first portion 146, and information identifying the location A. A second such node may include information indicating, for example, the temperature of the paving material 110 determined at the second portion 148, and information identifying the location A. The controller 150 may save such nodes and/or other corresponding information in a memory connected to the controller 150.

With continued reference to FIGS. 3 and 4, at 308 at least one of the temperature sensors 136, 138, 140, the controller 150, and/or other components of the control system 200 may determine a second temperature of the paving material 110. For example, at 308 the controller 150 may receive one or more signals from the temperature sensor 136 located proximate the first portion 146 of the auger assembly 114, as well as one or more corresponding signals from the additional temperature sensor (not shown) located proximate the second portion 148 of the auger assembly 114. Such signals may include information indicating respective temperatures of the paving material 110, determined at the first and second portions 146, 148 of the auger assembly 114 by the temperature sensor 136 and the additional temperature sensor, when the paving machine 100 is located at a second location along the path 402 different from the first location described above with respect to 306. Such signals may include information indicating respective temperatures of the paving material 110 determined at the first and second portions 146, 148 of the auger assembly 114 when the paving machine 100 is located at any second location along the path 402 between and/or including locations A and B. For example, such temperatures may be determined at regular intervals (every second, every two seconds, every five seconds, every ten seconds, every minute, etc.) or substantially continuously as the paving machine 100 travels in forward pave mode along the path 402. At 308, the controller 150 may also receive one or more additional signals (e.g., from the temperature sensor 138, from the temperature sensor 140, etc.) including corresponding additional information. In such examples, one or more such signals (e.g., the signals received from the temperature sensor 136 and from the additional temperature sensor located proximate the second portion 148 of the auger assembly 114) may also include third timestamp information indicating the moment in time (e.g., hour, minute, second, millisecond, etc.) at which the temperature information or other information included in the signal was determined. In some examples, at 308 the controller 150 may determine a second temperature of the paving material 110 as set on the paving surface 122 (e.g., a core temperature of the mat 120 of paving material 110) based at least partly on the temperature information and/or other information included in one or more of the signals described herein.

At 310, the communication device 132, the controller 150, and/or other components of the control system 200 may determine a second location of the paving machine 100 corresponding to the second temperature determined at 308. For example, at 310 the controller 150 may receive one or more signals from the communication device 132. Such signals may include GPS coordinates and/or other information determined by the communication device 132 and indicating the second location of the paving machine 100 along the path 402. As noted above, such a second location may comprise any location along the path 402 between and/or including locations A and B. Such signals may also include fourth timestamp information indicating the moment in time (e.g., hour, minute, second, millisecond, etc.) at which the second location information or other information included in the signal was determined. In such examples, at 310 the controller 150 may match the temperatures of the paving material 110 determined at the first and second portions 146, 148 (e.g., the temperatures determined at 308) with the second location determined at 310 based at least partly on the third and fourth timestamp information. The process for matching the temperatures of the paving material 110 determined at the first and second portions 146, 148 (e.g., the temperatures determined at 308) with the second location determined at 310 based at least partly on the third and fourth timestamp information may be similar to the process described above with respect to the first and second timestamp information. Similar to the processes noted above, in some examples the controller 150 may also generate respective nodes or other electronic data points based at least partly on determining that the temperatures of the paving material 110 determined at the first and second portions 146, 148 match the second location. A first such node may include information indicating, for example, the temperature of the paving material 110 determined at the first portion 146, and information identifying the second location. A second such node may include information indicating, for example, the temperature of the paving material 110 determined at the second portion 148, and information identifying the second location. The controller 150 may save such nodes and/or other corresponding information in a memory connected to the controller 150. Although not illustrated in FIG. 3, as part of the method 300 the controller 150 may repeat at least steps 304-310 for one or more of the paths 404, 406 included in the travel plan 400.

At 312, the controller 150 and/or other components of the control system 200 may generate a paving material map based at least partly on the first temperature determined at 304, the first location determined at 306, the second temperature determined at 308, and/or the second location determined at 310. In any of the examples described herein, the paving material map may be generated using and/or based on one or more of the nodes described above. A visual representation of an example paving material map 408 is illustrated in FIG. 4. In example embodiments, the paving material map 408 may take various different forms. For example, the paving material map 408 may comprise one or more text files, data files, video files, digital image files, thermal image files, and/or any other such electronic file that may be stored within a memory associated with the controller 150, that may be executed by the controller 150, and/or that may be transferred from the controller 150 to a computing device 204 and/or a mobile device 208 via the network 206. In some examples, the paving material map 408 may include the various nodes described above, and such nodes may be color-coded, hatched, patterned, shaded, and/or otherwise represented in such a paving material map 408. In any of the examples described herein, the paving material map 408 may include various information corresponding to and/or indicative of the information received at steps 304-310. Such paving material maps 408 may also include additional information to assist, for example, an operator of the paving machine 100 in adjusting paving parameters, compaction parameters, and/or other parameters associated with operating the paving machine 100 in order to optimize performance and/or efficiency. Such paving material maps 408 may also include information to assist, for example, a foreman on the worksite or a paving material plant employee manage haul truck delivery schedules, paving material plant temperatures, and/or other aspects of the paving process in order to optimize performance and/or efficiency.

As shown in FIG. 4, an example paving material map 408 (e.g., a visual representation of such a paving material map 408) may include visual indicia that correspond to and/or indicate the various paths 402, 404, 406 of the travel plan 400, the various temperatures of the paving material 110 deposited along such paths 402, 404, 406, various locations along such paths 402, 404, 406, various distances traveled by the paving machine 100 along such paths 402, 404, 406, and/or other information. For example, a paving material map 408 may include bars, lines, spectra, images, icons, or other graphics 410, 412 corresponding to the path 402 traversed by the paving machine 100 from location A to location B. In particular, the graphic 410 may be a visual representation of the temperatures of paving material 110 measured by the temperature sensor 136 as the paving machine 100 traveled from location A to location B along the path 402. Likewise, the graphic 412 may be a visual representation of the temperatures of the paving material 110 measured by the additional temperature sensor associated with the second portion 148 of the auger assembly 114 as the paving machine 100 traveled from location A to location B along the path 402. In any of the examples described herein, the graphics 410, 412 and/or other graphics of a paving material map 408 may comprise visual representations of the various nodes described above, arranged in sequential order (e.g., chronological order) according to the timestamp information associated with each node.

In some examples, the graphic 410 may include visual indicia (e.g., color, shading, hatching, one or more patterns, etc.) indicating the first temperature determined at 304, the second temperature determined at 308, and/or any of the other temperatures determined between the first and second locations described above. Such visual indicia may visually represent and/or otherwise illustrate the first temperature determined at 304 differently from the second temperature determined at 308. In some embodiments, at 312 the controller 150 may assign respective colors of the visible spectrum, hatching, patterns, or other visual indicia to individual temperatures or ranges of temperatures determined at 304 and/or 308. For example, paving material temperatures determined at 304 and/or 308 above 310 degrees Fahrenheit may be assigned the color red, paving material temperatures determined at 304 and/or 308 between 310 degrees Fahrenheit and 300 degrees Fahrenheit may be assigned the color orange, paving material temperatures determined at 304 and/or 308 between 299 degrees Fahrenheit and 290 degrees Fahrenheit may be assigned the color yellow, and so on. In such embodiments, the graphic 410 may include visual indicia (e.g., different colors) indicating the first temperature determined at 304, the second temperature determined at 308, and/or any other temperatures determined as the paving machine 100 travels along one of the paths 402, 404, 406. For example, each of the nodes making up the graphic 410 may be assigned a respective color based at least partly on the temperature ranges described above and/or other such ranges. For example, a node associated with a paving material temperature equal to 302 degrees Fahrenheit may be assigned the color orange based on the example ranges noted above. In other examples, each of the nodes making up the graphic 410 may be assigned a respective shading, pattern, hatching, or other visual indicia based on the temperature ranges described above and/or other such ranges. The controller 150 may utilize a similar process for generating the graphic 412 at 312. Thus, together, graphics 410, 412 of the paving material map 408 may represent the temperatures of the paving material 110 simultaneously deposited by the first and second portions 146, 148 of the auger assembly 114 as the paving machine 100 travels along the path 402. As noted above, the visual indicia of the respective graphics 410, 412 may visually represent differences and/or changes in the temperature of the paving material 110 between, for example, the first and second locations.

In some examples, the paving material map 408 may also include a first identifier (e.g., the letter "A") indicating the first location (e.g., the location A along the path 402) at which the first temperature was determined, as well as a second identifier (e.g., the letter "B") indicating the second location (e.g., the location B along the path 402) at which the second temperature was determined. In some examples, such indicators may comprise, for example, labels, location names, GPS coordinates of the respective locations, and/or other information determined at 306 or 310.

As shown in FIG. 4, the graphics 410, 412 included in the paving material map 408 may also include text, coordinate indicators, markers, segments, linear demarcations, hash marks, and/or other visual indicia 414 416 indicating various increments of distance traveled by the paving machine 100. For example, each visual indicia 414, 416 may be indicative of five feet, ten feet, twenty feet, fifty feet, one hundred feet, or any other increment of distance traveled by the paving machine 100 while in forward pave mode along the path 402, and while depositing paving material 110 on the paving surface 122 along the path 402.

In examples in which the travel plan 400 includes one or more additional paths 404, 406, the paving material map 408 may also include portions corresponding to such paths 404, 406. For example, in the embodiment shown in FIG. 4 the paving material map 408 may include one or more bars, lines, spectra, images, icons, or other graphics 418, 420 corresponding to the path 404. Similar to the graphics 410, 412 described above, the graphics 418, 420 may include respective visual indicia (e.g., color, shading, hatching, one or more patterns, etc.) indicating corresponding temperatures of the paving material 110. Such graphics 418, 420 may comprise a plurality of sequentially arranged nodes as described above. Additionally, the paving material map 408 may include text, coordinate indicators, markers, segments, linear demarcations, hash marks, and/or other visual indicia 422, 424 indicating various increments of distance traveled by the paving machine 100. For example, each visual indicia 422, 424 may be indicative of an increment of distance traveled by the paving machine 100 while in forward pave mode along the path 404, and while depositing paving material 110 on the paving surface 122. As shown in FIG. 4, an example paving material map 408 may further include one or more bars, lines, spectra, images, icons, or other graphics 426, 428 corresponding to the path 406. Similar to the graphics 410, 412 described above, the graphics 426, 428 may include respective visual indicia (e.g., color, shading, hatching, one or more patterns, etc.) indicating corresponding temperatures of the paving material 110. Such graphics 426, 428 may comprise a plurality of sequentially arranged nodes as described above. Additionally, the paving material map 408 may include text, coordinate indicators, markers, segments, linear demarcations, hash marks, and/or other visual indicia 430, 432 indicating various increments of distance traveled by the paving machine 100 while in forward pave mode along the path 406, and while depositing paving material 110 on the paving surface 122.

With continued reference to FIG. 3, at 314 the controller 150 may cause at least part of the paving material map 408 to be displayed via the control interface 128 of the paving machine 100. In some examples, the at least part of the paving material map 408 caused to be displayed at 314 may comprise part of at least one of the graphics 410, 412, 418, 420, 426, 428 described above, and/or at least one of the visual indicia 414, 416, 422, 424, 430, 432. For example, at 314 the controller 150 may cause at least part of the graphic 410 to be displayed, and the at least part of the graphic 410 caused to be displayed at 314 may include visual indicia indicating at least one of the first temperature determined at 304, the first location determined at 306, the second temperature determined at 308, and the second location determined at 310.

In other examples, at 314 the controller 150 may cause at least part of the graphic 410 to be displayed together with a corresponding at least part of the graphic 412. In such examples, the graphic 410 may be displayed adjacent to the graphic 412, spaced from the graphic 412, and/or in any other convenient manner. Further, the at least part of the graphic 410 caused to be displayed at 314 may include visual indicia indicating at least one of the first temperature determined by the temperature sensor 136 at 304, the first location determined at 306, the second temperature determined by the temperature sensor 136 at 308, and the second location determined at 310. Similarly, the at least part of the graphic 412 caused to be displayed together with the graphic 410 at 314 may indicate at least one of the first temperature determined by the additional temperature sensor associated with the second portion 148 of the auger assembly 114 at 304, the first location determined at 306, the second temperature determined by the additional temperature sensor at 308, and the second location determined at 310. In still further example embodiments, at 314 the controller 150 may cause substantially the entire paving material map 408 to be displayed via the control interface 128.

Figure 5:
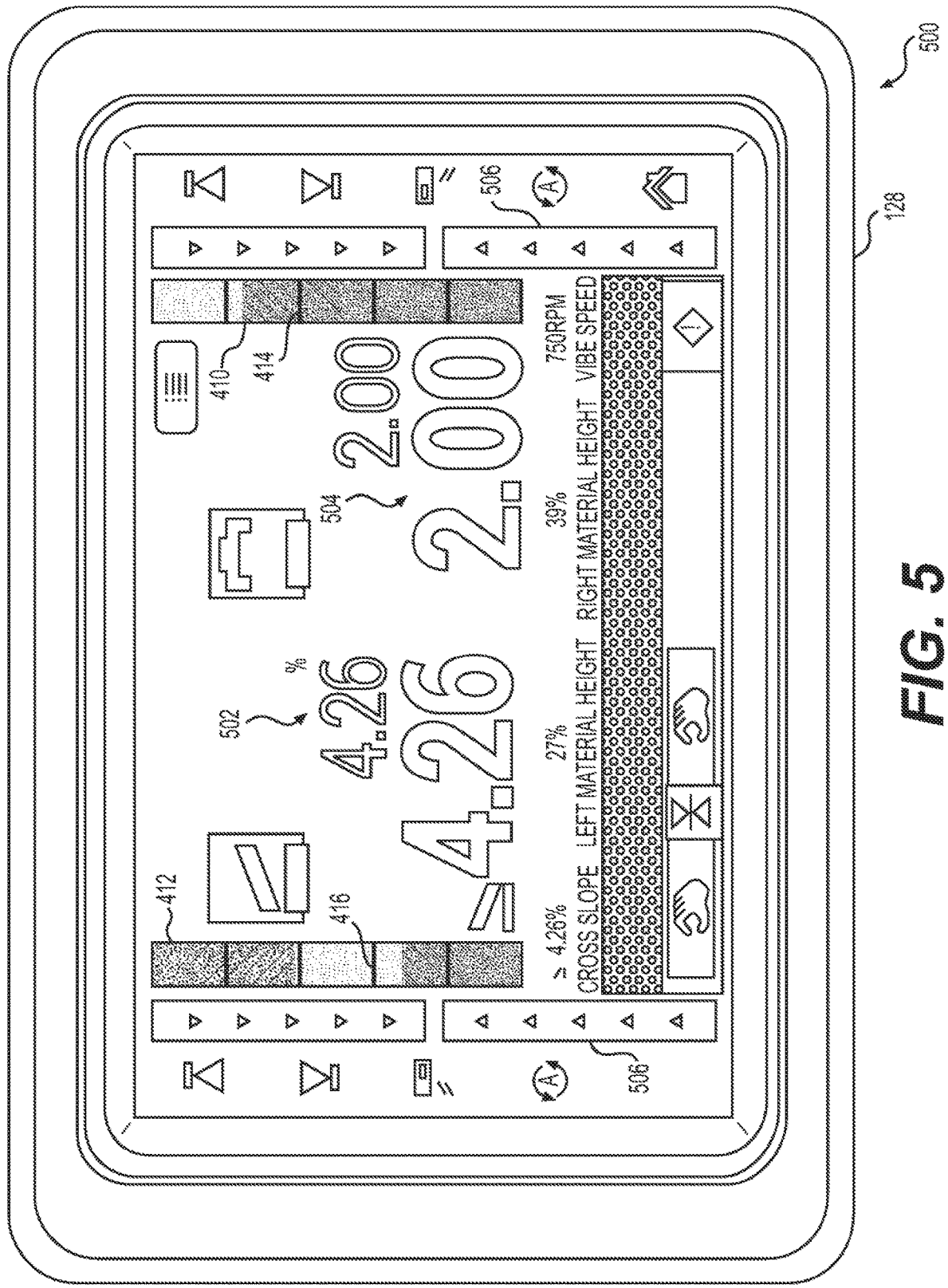
FIG. 5 is an example screenshot of a control interface displaying at least part of a paving material map according to an example embodiment of the present disclosure.

FIGS. 5-9 illustrate example screenshots of the control interface 128 associated with causing at least part of the paving material map 408 to be displayed at 314. As noted above, the control interface 128 may comprise an analog, digital, and/or touchscreen display, and such a control interface 128 may be configured to display at least part of the paving material map 408. As shown in FIG. 5, in some examples at 314 the controller 150 may cause the control interface 128 to display a user interface 500 that includes at least part of the graphic 410 and at least part of the graphic 412. For example, the user interface 500 may include the graphic 410 located on a right-hand side of the control interface 128 to indicate a correspondence between the graphic 410 and the temperatures measured by the temperature sensor 136 associated with the first portion 146 of the auger assembly 114. Likewise, the user interface 500 may include the graphic 412 located on a left-hand side of the control interface 128 to indicate a correspondence between the graphic 412 and the temperatures measured by the additional temperature sensor associated with the second portion 148 of the auger assembly 114.

The user interface 500 may also include at least one of the location identifiers described above. For example, the user interface 500 may include the first identifier (the letter "A") associated with the graphic 410 and indicating the first location (e.g., the location A) at which a first temperature was determined by the temperature sensor 136. The user interface 500 may also include such a first identifier (the letter "A") associated with the graphic 412 indicating the first location (e.g., the location A) at which a first temperature was determined (e.g., simultaneously) by the additional temperature sensor associated with the second portion 148 of the auger assembly 114. As noted above, in further examples, such indicators may comprise, for example, labels, location names, GPS coordinates of the respective locations, and/or other information determined at 306 or 310.

The user interface 500 may further include text, coordinate indicators, markers, segments, linear demarcations, hash marks, and/or other visual indicia 414, 416 indicating various increments of distance traveled by the paving machine 100. As noted above, each visual indicia 414, 416 may be indicative of an increment of distance traveled by the paving machine 100 while in forward pave mode along the path 402, and while depositing paving material 110 on the paving surface 122. In any of the embodiments described herein, the graphics 410, 412 and/or other components of the user interface 500 may be displayed and/or updated in real-time to assist the operator in controlling operation of the paving machine 100. Additionally, in some embodiments at least one of the graphics 410, 412 may scroll from the bottom of the user interface 500 to the top of the user interface 500, or vice versa, to indicate temperature changes in the paving material 110, in real time, as the paving machine 100 travels along the path 402 in forward pave mode. Moreover, as shown in FIG. 5, one or more of the graphics 410, 412, visual indicia 414, 416, and/or other components of the user interface 500 may be displayed together with additional information associated with the paving machine 100. For example, such components of the user interface 500 may be displayed together with grade information 502 indicating a slope and/or grade of the mat 120 as laid, thickness information 504 indicating a thickness of the mat 120 as laid, direction information 506 indicating a direction required to achieve a thickness and/or slope of the mat 120, and/or other operational information that may be helpful to an operator of the paving machine 100.

Figure 6:
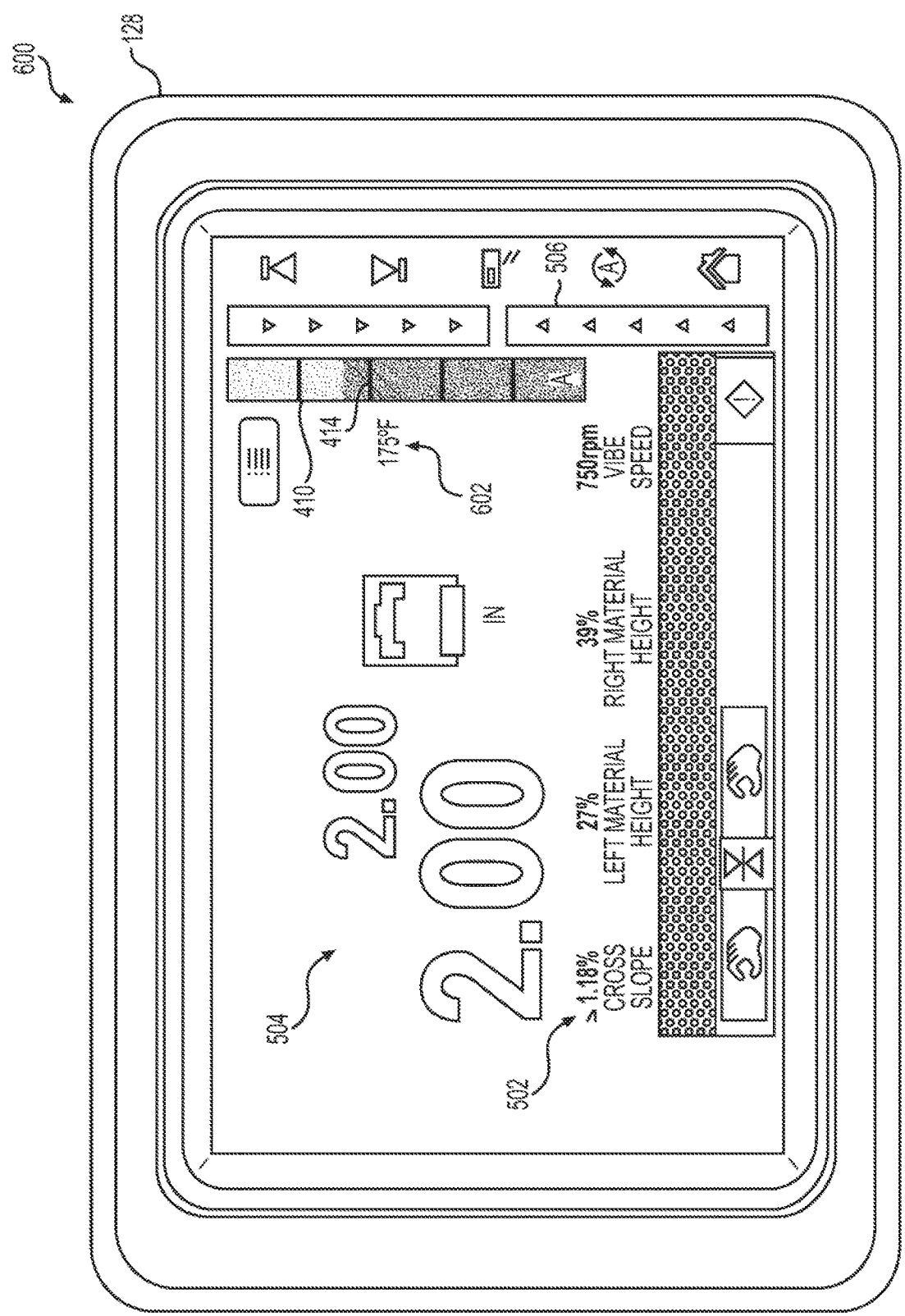
FIG. 6 is another example screenshot of a control interface displaying at least part of a paving material map according to an example embodiment of the present disclosure.

As shown in FIG. 6, in some examples at 314 the controller 150 may cause the control interface 128 to display a user interface 600 that includes at least part of either the graphic 410 or the graphic 412. For example, the user interface 600 may include the graphic 410 located on a right-hand side of the control interface 128 to indicate a correspondence between the graphic 410 and the temperatures measured by the temperature sensor 136 associated with the first portion 146 of the auger assembly 114. Alternatively, the user interface 600 may include the graphic 412 located on a left-hand side of the control interface 128 to indicate a correspondence between the graphic 412 and the temperatures measured by the additional temperature sensor associated with the second portion 148 of the auger assembly 114.

Such an example user interface 600 may also include at least one of the location identifiers described above. For example, the user interface 600 may include the first identifier (the letter "A") associated with the visual indicia 410 and indicating the first location (e.g., the location A) at which a first temperature was determined by the temperature sensor 136. As noted above, in further examples, such indicators may comprise, for example, labels, location names, GPS coordinates of the respective locations, and/or other information determined at 306 or 310. The user interface 600 may further include text, coordinate indicators, markers, segments, linear demarcations, hash marks, and/or other visual indicia 414 indicating various increments of distance traveled by the paving machine 100 while in forward pave mode along the path 402, and while depositing paving material 110 on the paving surface 122.

Moreover, as shown in FIG. 6, the graphic 410, the visual indicia 414, and/or other components of the user interface 600 may be displayed together with additional information associated with the paving machine 100. For example, such components of the user interface 600 may be displayed together with grade information 502, thickness information 504, direction information 506, and/or other operational information that may be helpful to an operator of the paving machine 100. As shown in FIG. 6, the user interface 600 may also include real-time temperature information 602 indicating, for example, the current temperature of the paving material 110 at the hopper 108, at the first portion 146 of the auger assembly 114, at the second portion 148 of the auger assembly 114, and/or at other locations.

Figure 7:
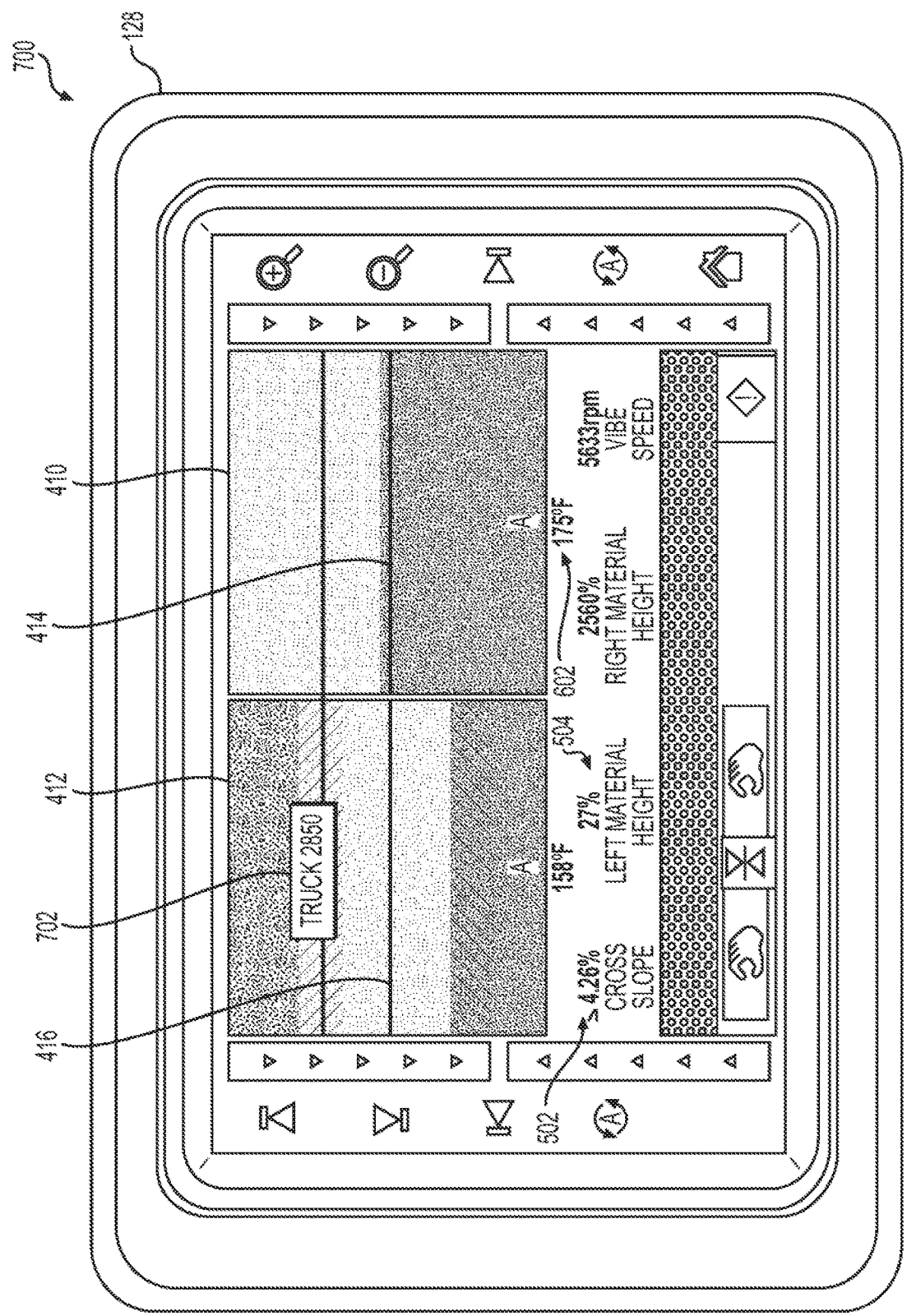
FIG. 7 is yet another example screenshot of a control interface displaying at least part of a paving material map according to an example embodiment of the present disclosure.

As shown in FIG. 7, in some examples at 314 the controller 150 may cause the control interface 128 to display a user interface 700 that includes at least part of the graphic 410 and at least part of the graphic 412. For example, the user interface 700 may include the graphic 410 located on a right-hand side of the control interface 128 to indicate a correspondence between the graphic 410 and the temperatures measured by the temperature sensor 136 associated with the first portion 146 of the auger assembly 114. Likewise, the user interface 700 may include the graphic 412 located on a left-hand side of the control interface 128 to indicate a correspondence between the graphic 412 and the temperatures measured by the additional temperature sensor associated with the second portion 148 of the auger assembly 114.

The user interface 700 may also include at least one of the location identifiers described above. For example, the user interface 700 may include the first identifier (the letter "A") associated with the graphic 410 and indicating the first location (e.g., the location A) at which a first temperature was determined by the temperature sensor 136. The user interface 700 may also include such a first identifier (the letter "A") associated with the graphic 412 indicating the first location (e.g., the location A) at which a first temperature was determined by the additional temperature sensor associated with the second portion 148 of the auger assembly 114. The user interface 700 may further include text, coordinate indicators, markers, segments, linear demarcations, hash marks, and/or other visual indicia 414, 416 indicating various increments of distance traveled by the paving machine 100. As noted above, each visual indicia 414, 416 may be indicative of an increment of distance traveled by the paving machine 100 while in forward pave mode along the path 402, and while depositing paving material 110 on the paving surface 122.

Figure 8:
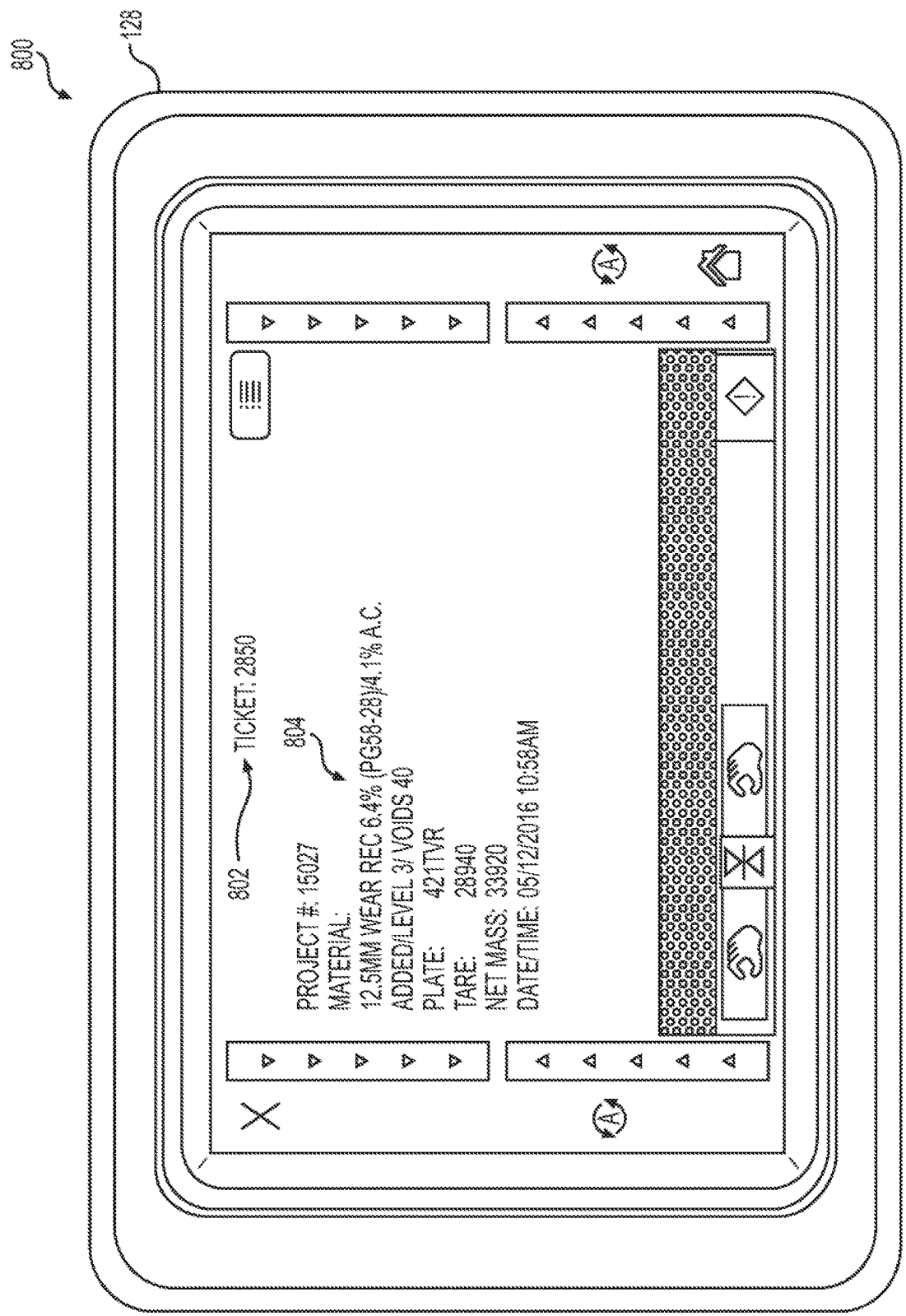
FIG. 8 is still another example screenshot of a control interface displaying haul truck ticket information according to an example embodiment of the present disclosure.

It is also understood that any of the example user interfaces described herein with respect to the control interface 128 may be interactive. For example, in embodiments in which the control interface 128 comprises a touch screen or other like component, an operator may provide touch inputs via the control interface 128 to obtain additional information and/or to affect the display of information. For example, the user interface 700 may include one or more tags or other like input fields 702. In the embodiment of FIG. 7, such an input field 702 may comprise a haul truck ticket tag. In such examples, the operator of the paving machine 100 may provide a swipe, touch, tap, tap and hold, and/or other such input via the input field 702 displayed in the user interface 700. The controller 150 may cause further information to be displayed via the control interface 128 at least partly in response to such an input. For example, as shown in FIG. 8, in response to such an input the controller 150 may cause the control interface 128 to display an additional user interface 800. Such an example user interface 800 may include haul truck ticket information 802, paving material information 804, and/or other information related to a delivery of paving material 110 corresponding to the input field 702. Such haul truck ticket information 802 may include, for example, a ticket number, a project number or other identifier, a license plate number or other haul truck identifier, a date and/or time at which the haul truck ticket was printed at the paving material plant, and/or other like information. Such paving material information 804 may include, for example, a type, composition, and/or description of the paving material 110, a mass of the paving material 110, and/or other like information.

Figure 9:
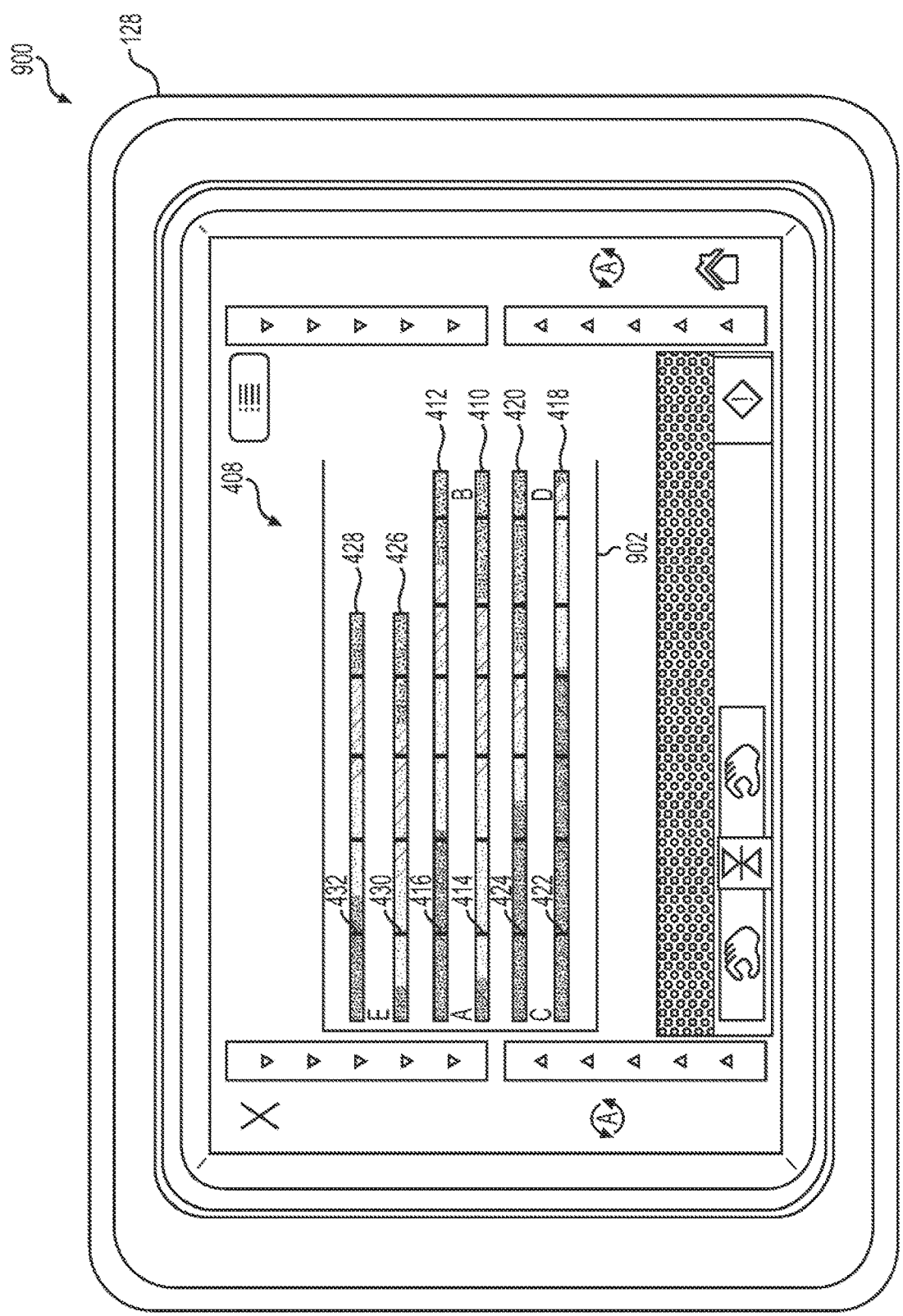
FIG. 9 is another example screenshot of a control interface displaying at least part of a paving material map according to an example embodiment of the present disclosure.

As shown in FIG. 9, in some examples at 314 the controller 150 may cause the control interface 128 to display a user interface 900 that includes substantially the entire paving material map 408 in real-time. For example, such a user interface 900 may include any of the graphics 410, 412, 418, 420, 426, 428, visual indicia 414, 416, 422, 424, 430, 432, and/or other indicators, information, or components described above. In some examples, the paving material map 408 may be displayed in the user interface 900 overlaying an image 902 illustrating the mat 120 and/or the paving surface 122. Such a user interface 900 may be substantially continuously updated, in real time, to represent ongoing paving activities by the paving machine 100. While the example paving material map 408 illustrated in FIG. 9 corresponds to, for example, the travel plan 400 shown in FIG. 4 and including three separate paths 402, 404, 406, in other example embodiments the paving material map 408 may correspond to a travel plan including greater than or less than three paths 402, 404, 406 in order to produce a mat 120 of desirable width. As illustrated in FIG. 9, in some examples the user interface 900 may display the graphic 410 adjacent to the graphic 412, and may display the graphic 418 adjacent to the graphic 420. Additionally, the user interface 900 may display the graphic 410 adjacent to the graphic 420. In such examples, it is understood that the temperatures associated with location A may be determined simultaneously, the temperatures associated with location B may be determined simultaneously, the temperatures associated with location C may be determined simultaneously, the temperatures associated with location D may be determined simultaneously, and so on. Additionally, it is understood that the temperatures associated with location C may be determined after the temperatures associated with location C have been determined.

INDUSTRIAL APPLICABILITY

The present disclosure provides systems and methods for generating a paving material map 408 associated with a mat 120 of paving material 110 formed at a worksite. Such systems and methods may be used to achieve better paving and compacting performance. Additionally, such systems and methods may be used to improve efficiencies in haul truck scheduling, as well as to accurately manage paving material plant temperatures. As noted above with respect to FIGS. 1-9, an example method 300 of generating a paving material map 408 may include determining first and second temperatures of paving material 110 being deposited on a paving surface 122 by a paving machine 100. Such an example method 300 may also include determining first and second locations of the paving machine 100 corresponding to the first and second temperatures, respectively. Using this information, as well as timestamp information corresponding such temperatures and locations, a controller 150 of the paving machine 100 may match the first temperature with the first location, and may match the second temperature with the second location. The controller 150 may generate a paving material map 408 corresponding to such matched information, and may cause a control interface 128 of the paving machine 100 to display at least part of the paving material map 408.

By displaying at least part of the paving material map 408 via the control interrace 128, an operator of the paving machine 100 may consume the temperature information, location information, and/or other information provided by the paving material map 408 during one or more paving operations. The operator may utilize such information to modify various paving parameters of the paving machine 100, and/or may communicate such information to one or more other machines for changing their respective paving or compaction parameters. The controller 150 may also be configured to provide such information to a mobile device 208 used by, for example, a foreman at the worksite and/or to a computing device 204 located at, for example, a remote paving material production plant. Such information may be used by, for example, the foreman to improve the efficiency of various paving activities at the worksite. Such information may also be used by the paving material production plant to more closely manage paving material temperatures and/or to optimize the scheduling of haul truck deliveries. Thus, the example systems and methods described above may provide considerable cost savings, and may reduce the time and labor required for various paving activities at the worksite.

While aspects of the present disclosure have been particularly shown and described with reference to the embodiments above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method, comprising:
   determining a first temperature of paving material at an auger assembly of a paving machine, the paving machine depositing the paving material on a paving surface;
   determining a first location of the paving machine corresponding to the first temperature;
   determining a second temperature of the paving material at the auger assembly;
   determining a second location of the paving machine corresponding to the second temperature, wherein the second location is different from the first location;
   generating a paving material map based at least partly on the first temperature, the first location, the second temperature, the second location, and timestamp information corresponding to at least one of the first temperature and the first location; and
   causing at least part of the paving material map to be displayed via a control interface of the paving machine, the at least part of the paving material map displayed via the control interface including a first graphic, the first graphic including visual indicia indicating the first temperature and the second temperature.

2. The method of claim 1, further comprising:
   receiving the timestamp information, the timestamp information comprising first timestamp information corresponding to the first temperature, and second timestamp information corresponding to the first location; and
   matching the first temperature and the first location based at least partly on the first timestamp information and the second timestamp information.

3. The method of claim 2, further comprising generating the paving material map based at least partly on the first timestamp information, the second timestamp information, and third timestamp information corresponding to at least one of the second temperature and the second location.

4. The method of claim 1, wherein the first temperature and the second temperature are determined by a first temperature sensor located proximate a first portion of the auger assembly on a first side of the paving machine, the method further comprising:
   determining a third temperature of the paving material with an additional temperature sensor located proximate a second portion of the auger assembly, wherein the second portion is located on a second side of the paving machine opposite the first side, and the third temperature is determined simultaneously with the first temperature; and
   determining a fourth temperature of the paving material with the additional temperature sensor and simultaneously with the second temperature, wherein the paving material map includes a second graphic, the second graphic including visual indicia indicating the third temperature and the fourth temperature.

5. The method of claim 4, wherein the at least part of the paving material map displayed via the control interface includes the first graphic and the second graphic.

6. The method of claim 5, wherein the at least part of the paving material map displayed via the control interface includes:
   a third graphic including visual indicia indicating a fifth temperature of the paving material determined by the first temperature sensor at the first portion of the auger assembly, and a sixth temperature of the paving material determined by the first temperature sensor at the first portion of the auger assembly; and
   a fourth graphic including visual indicia indicating a seventh temperature of the paving material determined by the additional temperature sensor at the second portion of the auger assembly, and an eighth temperature of the paving material determined by the additional temperature sensor at the second portion of the auger assembly, wherein
   the first graphic is displayed adjacent to the second graphic,
   the third graphic is displayed adjacent to the fourth graphic, and
   the first graphic is displayed adjacent to the fourth graphic.

7. The method of claim 6, wherein the fifth temperature is determined simultaneously with the seventh temperature, the sixth temperature is determined simultaneously with the eighth temperature, and the fifth temperature is determined after the fourth temperature.

8. The method of claim 1, wherein the at least part of the paving material map displayed via the control interface includes visual indicia indicating a distance traveled by the paving machine between the first location and the second location.

9. The method of claim 1, wherein the at least part of the paving material map is displayed via the control interface together with at least one of grade information indicating a grade of the paving material, and thickness information indicating a thickness of the paving material.

10. The method of claim 1, wherein
the at least part of the paving material map is displayed via the control interface together with an input field, and
the controller is configured to cause haul truck ticket information to be displayed via the control interface at least partly in response to receiving an input via the input field.

11. A control system, comprising:
a communication device configured to determine a location of a paving machine;
a temperature sensor associated with the paving machine and configured to determine temperatures of paving material; and
a controller in communication with the communication device and the temperature sensor, the controller configured to:
receive a first signal from the temperature sensor, the first signal including first information indicative of a first temperature of the paving material,
receive a second signal from the communication device, the second signal including second information indicative of a first location of the paving machine corresponding to the first temperature,
receive a third signal from the temperature sensor, the third signal including third information indicative of a second temperature of the paving material,
receive a fourth signal from the communication device, the fourth signal including fourth information indicative of a second location of the paving machine corresponding to the second temperature,
generate a paving material map based at least partly on the first temperature, the first location, the second temperature, the second location, and timestamp information corresponding to at least one of the first temperature and the first location, and
cause at least part of the paving material map to be displayed via a control interface of the paving machine, the at least part of the paving material map displayed via the control interface including a first graphic, the first graphic including visual indicia indicating the first temperature and the second temperature.

12. The control system of claim 11, wherein the temperature sensor comprises a first temperature sensor located proximate a first portion of an auger assembly on a first side of the paving machine, the control system further comprising an additional temperature sensor located proximate a second portion of the auger assembly on a second side of the paving machine opposite the first side, the additional temperature sensor being configured to determine temperatures of the paving material simultaneous with the first temperature sensor.

13. The control system of claim 11, wherein generating the paving material map comprises:
matching the first temperature with the first location based at least partly on the timestamp information, wherein the timestamp information comprises first timestamp information included in the first signal and second timestamp information included in the second signal,
forming a first node corresponding to the first temperature and the first location, and
assigning a color to the first node based at least partly on the first temperature.

14. The control system of claim 11, wherein the visual indicia comprises at least one of color, shading, hatching, and a pattern, the visual indicia illustrating the first temperature differently from the second temperature.

15. The control system of claim 11, wherein the controller is in communication with at least one of a remote computing device and a mobile device via a network, the controller being configured to provide the paving material map to the at least one of the computing device and the mobile device via the network.

16. A paving machine, comprising:
a hopper adapted to receive paving material;
an auger assembly;
a conveyor system adapted to convey the paving material from the hopper to the auger assembly, wherein the auger assembly is adapted to provide the paving material received from the conveyor system to a screed portion of the paving machine;
a temperature sensor configured to determine temperatures of the paving material;
a communication device configured to determine a location of the paving machine; and
a controller in communication with the temperature sensor and the communication device, the controller configured to:
receive a first signal from the temperature sensor, the first signal including first information indicative of a first temperature of the paving material at a first portion of the auger assembly,
receive a second signal from the communication device, the second signal including second information indicative of a first location of the paving machine corresponding to the first temperate,
receive a third signal from the temperature sensor, the third signal including third information indicative of a second temperature of the paving material,
receive a fourth signal from the communication device, the fourth signal including fourth information indicative of a second location of the paving machine corresponding to the second temperature,
receive a fifth signal indicative of a third temperature of the paving material at a second portion of the auger assembly, the second portion of the auger assembly being disposed opposite the first portion, and
generate a paving material map based at least partly on the first temperature, the first location, the second temperature, the second location, and the third temperature, the paving material map including a first graphic, the first graphic including visual indicia indicating the first temperature and the second temperature.

17. The paving machine of claim 16, wherein the auger assembly includes a main auger and an auger extension operatively coupled to the main auger via an auger bearing, the temperature sensor being positioned proximate the auger assembly and configured to measure the first and second temperatures at the auger bearing.

18. The paving machine of claim 16, wherein the temperature sensor comprises a first temperature sensor located proximate the first portion of the auger assembly on a first side of the paving machine,
the second portion of the auger assembly being disposed on a second side of the paving machine opposite the first side, and
the paving machine further comprising an additional temperature sensor located proximate the second portion of the auger assembly on the second side of the paving machine.

19. The paving machine of claim 18, wherein the additional temperature sensor is configured to determine:
- the third temperature of the paving material, at the second portion of the auger assembly, simultaneously with the first temperature, and
- a fourth temperature of the paving material, at the second portion of the auger assembly, simultaneously with the second temperature,
- the controller being configured to generate the paving material map based at least partly on the third temperature and the fourth temperature.

20. The paving machine of claim 16, wherein the controller is configured to cause at least part of the paving material map to be displayed via a control interface of the paving machine, and to provide the paving material map to a remote computing device via a network.

* * * * *